(12) United States Patent
Ross

(10) Patent No.: US 10,422,519 B2
(45) Date of Patent: Sep. 24, 2019

(54) LIQUID-COOLED LED PLANT GROWING SYSTEMS AND METHODS

(71) Applicant: Dylan Ross, Portland, OR (US)

(72) Inventor: Dylan Ross, Portland, OR (US)

(*) Notice: Subject to any disclaimer, the term of this patent is extended or adjusted under 35 U.S.C. 154(b) by 337 days.

(21) Appl. No.: 15/486,193

(22) Filed: Apr. 12, 2017

(65) Prior Publication Data

US 2018/0295785 A1    Oct. 18, 2018

(51) Int. Cl.
| | | |
|---|---|---|
| *F21V 29/58* | (2015.01) | |
| *A01G 9/26* | (2006.01) | |
| *F21Y 115/10* | (2016.01) | |
| *F21V 31/00* | (2006.01) | |
| *F21Y 105/18* | (2016.01) | |

(52) U.S. Cl.
CPC ............... *F21V 29/59* (2015.01); *A01G 9/26* (2013.01); *F21V 31/00* (2013.01); *F21Y 2105/18* (2016.08); *F21Y 2115/10* (2016.08); *Y02P 60/149* (2015.11)

(58) Field of Classification Search
CPC . A01G 9/26; F21V 29/59; F21V 31/00; F21Y 2105/18; F21Y 2115/10
See application file for complete search history.

(56) References Cited

U.S. PATENT DOCUMENTS

| | | | | |
|---|---|---|---|---|
| 3,869,605 A * | 3/1975 | Davis | ................ | A01C 1/02 |
| | | | | 362/264 |
| 7,220,018 B2 * | 5/2007 | Crabb | ................ | A01G 7/045 |
| | | | | 362/231 |
| 8,651,704 B1 * | 2/2014 | Gordin | ................ | G16C 20/40 |
| | | | | 362/294 |
| 10,149,439 B2 * | 12/2018 | Hanson | ................ | A01G 7/045 |
| 2013/0114263 A1 * | 5/2013 | Peil | ................ | F21V 29/02 |
| | | | | 362/249.04 |
| 2015/0237761 A1 * | 8/2015 | Dunn | ................ | H05K 7/20154 |
| | | | | 362/97.3 |
| 2016/0041423 A1 * | 2/2016 | Dunn | ................ | H05K 7/20154 |
| | | | | 362/97.3 |
| 2016/0057944 A1 * | 3/2016 | Smits | ................ | A01G 9/26 |
| | | | | 362/373 |
| 2017/0241632 A1 * | 8/2017 | Nguyen | ................ | F21V 29/59 |
| 2017/0367274 A1 * | 12/2017 | Wheatley | ................ | A01G 9/24 |
| 2018/0128472 A1 * | 5/2018 | Nguyen | ................ | F21V 29/59 |

* cited by examiner

*Primary Examiner* — Joshua D Huson
(74) *Attorney, Agent, or Firm* — Mohr Intellectual Property Law Solutions, PC

(57) ABSTRACT

A controlled-environment plant growing systems are described. The system may include a plant growing enclosure, a liquid-cooled LED unit, an air cooler unit, an air heater unit, a heat exhaust unit, a recirculation pump, a chiller, and a controller. The enclosure may have mirror-like inner surfaces. The LED unit may include one or more LED modules and a transparent, liquid-tight housing encasing the LED modules. The housing may have a liquid inlet and a liquid outlet configured to flow a liquid coolant through the housing, thereby cooling the LED modules. The air cooler unit may be configured to cool the enclosure via the liquid coolant. The air heater unit may be configured to heat the enclosure via heat produce by the LED modules. The heat exhaust unit may be configured to exhaust excess heat remote of the enclosure. The controller may be configured to control one or more of the air cooler unit, the air heater unit, and/or the chiller in order to control the temperature within the enclosure.

19 Claims, 7 Drawing Sheets

LIQUID-COOLED LED PLANT GROWING SYSTEMS AND METHODS

BACKGROUND

The present disclosure relates generally to systems and methods of providing a controlled environment in which to grow plants. In particular, systems and methods of providing light and in some cases, climate control, to an enclosure via a liquid-cooled LED (Light-Emitting Diode) system are described.

Known LED systems are not entirely satisfactory for the range of applications in which they are employed. For example, existing LED systems are either not powerful enough to provide sufficient light to growing plants in an enclosed environment, or they exhaust too much heat into the enclosed environment.

Thus, there exists a need for LED systems that improve upon and advance the design of known systems. Examples of new and useful LED systems relevant to the needs existing in the field are discussed below.

SUMMARY

A controlled-environment plant growing systems are described. The system may include a plant growing enclosure, a liquid-cooled LED unit, an air cooler unit, an air heater unit, a heat exhaust unit, a recirculation pump, a chiller, and a controller. The enclosure may have mirror-like inner surfaces. The LED unit may include one or more LED modules and a transparent, liquid-tight housing encasing the LED modules. The housing may have a liquid inlet and a liquid outlet configured to flow a liquid coolant through the housing, thereby cooling the LED modules. The air cooler unit may be configured to cool the enclosure via the liquid coolant. The air heater unit may be configured to heat the enclosure via heat produce by the LED modules. The heat exhaust unit may be configured to exhaust excess heat remote of the enclosure. The controller may be configured to control one or more of the air cooler unit, the air heater unit, and/or the chiller in order to control the temperature within the enclosure.

DETAILED DESCRIPTION

The disclosed LED systems and methods will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various LED systems and methods are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
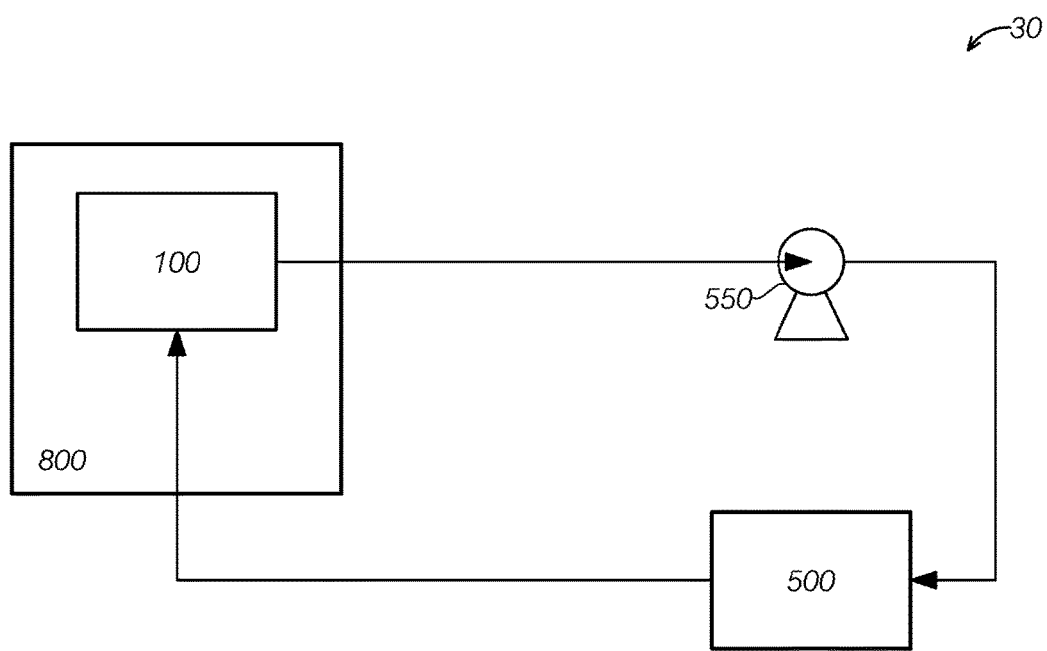
FIG. 1 is a schematic view of a first embodiment of a liquid-cooled LED plant growing system.

With reference to FIG. 1, a first example of a liquid cooled LED plant growing system, system 30, will now be described. System 30 functions to very efficiently provide light to plant growing enclosure 800, without radiating excessive amounts of heat into enclosure 800. The reader will appreciate from the figures and description below that system 30 addresses shortcomings of conventional LED systems.

System 30 includes LED unit 100 mounted inside enclosure 800, recirculation pump 550 and heat exhaust unit 500. LED unit 100 comprises a liquid-tight housing in thermal communication with one or more LED modules. LED unit 100 is configured to be cooled via a recirculating liquid coolant.

Heat exhaust unit 500 is in fluid communication with the housing of LED unit via, for example, a section of polymer hose. Heat exhaust unit 500 is configured to receive the liquid coolant form the housing. Heat exhaust unit 500 is configured to transfer heat from the liquid coolant and into the ambient atmosphere. Heat exhaust unit 500 may be located remote of enclosure 800. Thus, heat produced by the operation of the LED modules 120, 130 may be exhausted remote of the enclosure via heat exhaust unit 500, thereby preventing undesirable heating of enclosure 800.

The liquid coolant may be circulated via recirculation pump 550. Recirculation pump 550 may be in fluid communication with the heat exhaust unit 500 and the housing. Recirculation pump may be any suitable pump, for example a centrifugal pump, among many others.

In other examples, described below, an LED system may include components to actively control the atmosphere inside the enclosure, such as a temperature probe within the enclosure, a control system, an in-line chiller and one or more forced-air heat exchangers inside the enclosure to cool the air within the enclosure.

Figure 2:
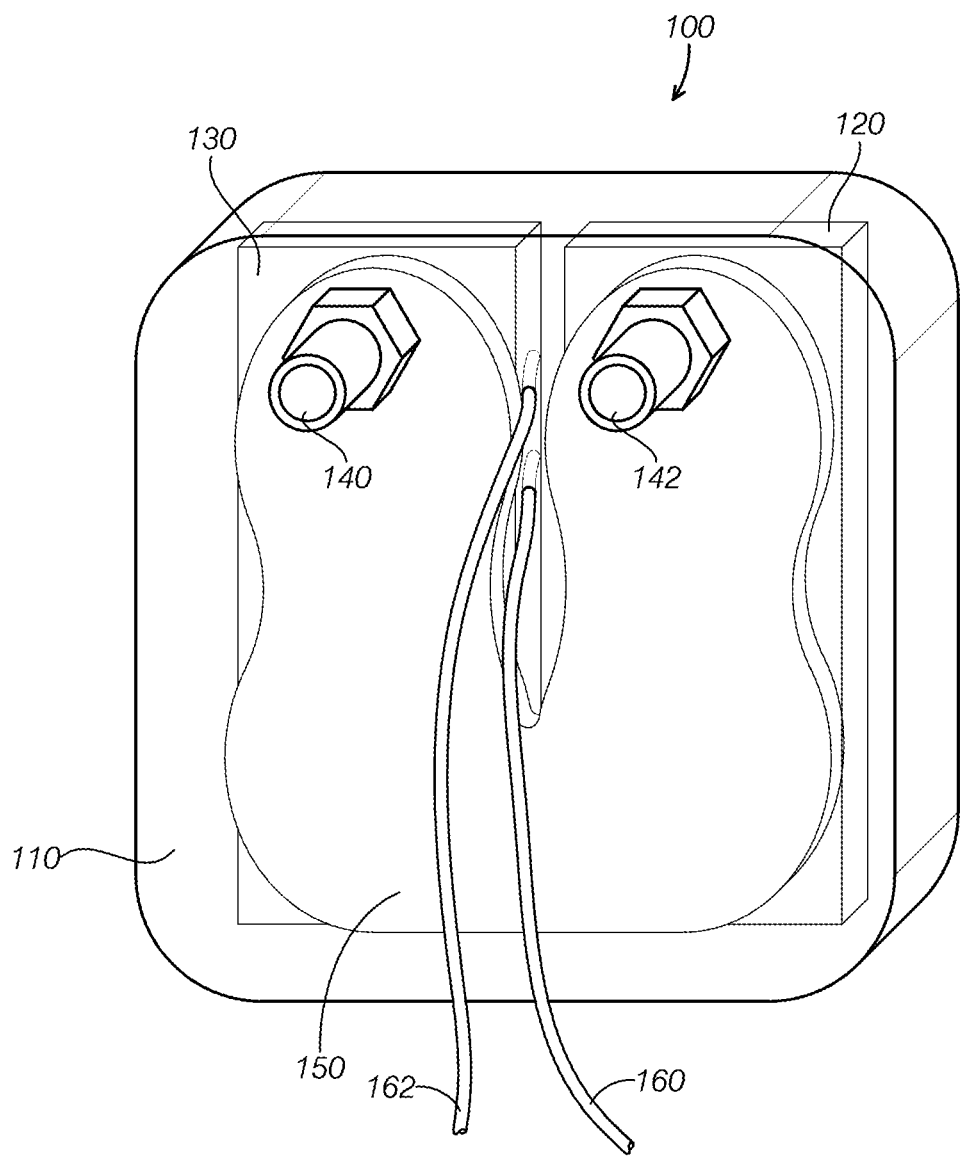
FIG. 2 is a rear view of one embodiment of a housing for a liquid-cooled LED unit.

As can be seen in FIG. 2, LED unit 100 includes LED modules 120, 130, encased in a transparent housing 110 having a liquid inlet 140 and a liquid outlet 142. Housing 110 includes a conduit 150 formed therein. The conduit 150 is configured to channel a liquid coolant from the liquid inlet 140, through housing 110, and out the liquid outlet 142.

LED modules 120, 130, are in thermal communication with the walls of conduit 150. For example, as shown in FIG. 2, the rear surfaces of the respective submounts of LED modules 120, 130 are in thermal communication with the walls of conduit 150. In this manner, the liquid coolant may remove heat from the LED modules 120, 130.

The housing 110 may include a transparent base and a transparent cover. In the illustrated example the base and the cover are integral pieces of housing 110. In other examples (not illustrated) the base and the cover may be separate components joined, for example, via an adhesive.

Housing 110 may include electrical connections 160, 162 to supply LED modules with power. The housing 110 may further include a thermostat switch configured to monitor the operating temperature of the LED modules. In one example the thermostat switch may be a bi-metal thermostat switch configured to automatically power off the one or more LED modules if a threshold operating temperature is exceeded. The operating temperature may be exceeded for example, if the liquid cooling system fails. The thermostat switch may be configured to automatically reset once the operating temperature falls below the threshold temperature.

Housing 110 may be comprised of any suitable transparent material, including one or more polymer plastics, and/or glass.

As discussed above, LED unit 100 may be mounted in enclosure 800. Enclosure 800 may have one or more mirror-like interior surfaces. As used herein, a "mirror-like surface" is a surface that reflects at least 75% of the visible light incident upon it. Enclosure 800 may be configured to enclose one or more living plants for the purpose of providing enhanced and/or more easily controlled growing conditions. The LED unit 100 may be disposed in enclosure 800 to cast light onto the one or more living plants. Inevitably, however, some of the light produced by LED unit 100 may be inadvertently directed onto the mirror-like inner surfaces of enclosure 800. The light may bounce off the mirror-like inner surfaces until being absorbed by a light absorbing surface, such as the surface of the one or more living plants. In some embodiments, enclosure 800 may be a sealed enclosure (e.g., essentially air tight).

Non limiting examples of mirror-like surface include conventional metallic mirrors (e.g., silver mirrors), surfaces coated with metallic material, and metallic foils, among others.

In one embodiment, at least 50% of the surface area of the interior of enclosure 800 may comprise mirror-like surfaces. In another embodiment, at least 60% of the surface area of the interior of enclosure 800 may comprise mirror-like surfaces. In yet another embodiment, at least 70% of the surface area of the interior of enclosure 800 may comprise mirror-like surfaces. In another embodiment, at least 80% of the surface area of the interior of enclosure 800 may comprise mirror-like surfaces. In yet another embodiment, at least 85% of the surface area of the interior of enclosure 800 may comprise mirror-like surfaces. In another embodiment, at least 90% of the surface area of the interior of enclosure 800 may comprise mirror-like surfaces.

Thus, in some embodiments, light may be reflected off the inner mirror-like surfaces in all directions within the enclosure 800. Therefore any light absorbing surfaces within the enclosure may tend to absorb a significant amount of light. The inventor has found that these surfaces may in turn tend to radiate an undesirable amount of heat into the enclosure. In this regard, the components of the LED unit, apart from the LED modules themselves, may be nearly entirely comprised of transparent materials. Thus, the reflected light from the inner surfaces of the enclosure may pass through the LED unit rather than be absorbed therein. In this manner, the transparent materials of the LED unit may facilitate a more desirable temperature within the enclosure.

Furthermore, in the illustrated embodiment, the LED unit may be free of any metal heatsink of the type commonly associated with conventional LED units. Indeed, in some embodiments, the LED unit may be essentially free of metal components, other than those metal components associated with the LED modules themselves. The inventor has found that the transparent liquid-cooled housing provides sufficient heat removal, even in those embodiments where the housing is comprised of plastic materials. The use of mirror-like surfaces on the interior of a plant growing enclosure has heretofore been impractical or impossible via conventional LED systems due to undesirable heating within the enclosure.

Figure 3:
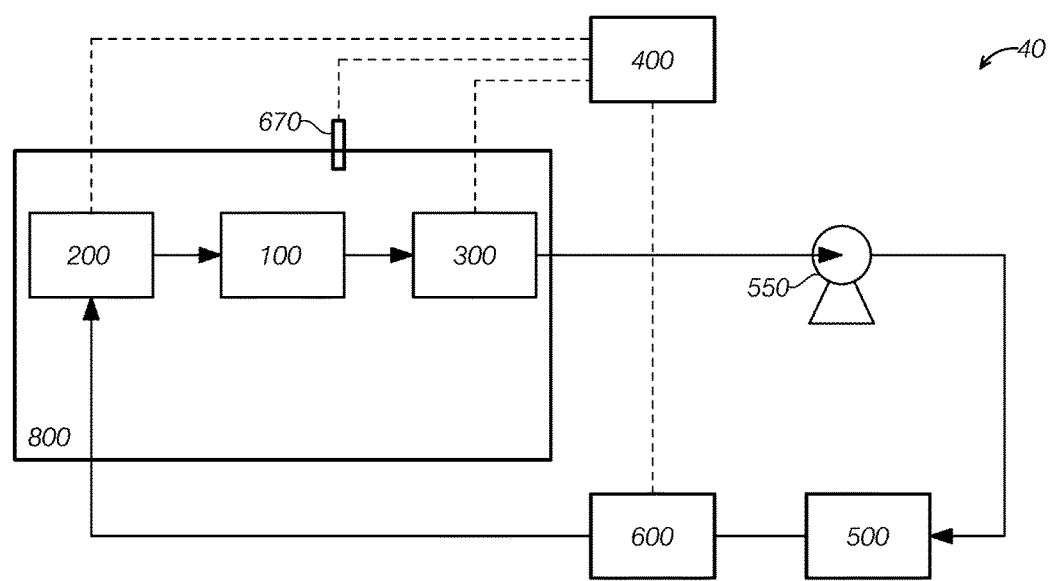
FIG. 3 is a schematic view of a second embodiment of a liquid-cooled LED plant growing system, including temperature control system to control the temperature of the plant enclosure.

Turning now to FIG. 3, a second embodiment of a liquid cooled LED plant growing system, system 40, will now be described. System 40 includes many similar or identical features to system 30. Thus, for the sake of brevity, each feature of system 40 will not be redundantly explained. Rather, key distinctions between system 30 and system 40 will be described in detail and the reader should reference the discussion above for features substantially similar between the two systems.

As can be seen in FIG. 3, system 40 includes LED unit 100 as well as air cooler unit 200 and an air heater unit 300 mounted inside enclosure 800, recirculation pump 550, heat exhaust unit 500 and chiller 600. System 40 further includes a controller 400 and a temperature probe 670.

As described above, LED unit 100 is configured to be cooled via a recirculating liquid coolant. The liquid coolant may be circulated via recirculation pump 550. Heat drawn from the one or more LED modules may be exhausted from the liquid coolant via heat exhaust unit 500. Heat exhaust unit 500 and/or chiller 600 may be located remote of enclosure 800. Thus, heat produced by the operation of the LED modules may be exhausted remote of the enclosure, thereby preventing undesirable heating of enclosure 800.

Chiller 600 may be in liquid communication with the heat exhaust unit 500 and the LED unit 100. The chiller 600 may be configured to receive liquid from heat exhaust unit 500. Chiller 600 may cool the liquid coolant below ambient temperature. In one embodiment, chiller 600 may contain a refrigerant fluid. Chiller 600 may cycle the refrigerant fluid through a vapor-compression refrigeration cycle to chill the refrigerant fluid below ambient temperature.

Chiller 600 may include a heat exchanger to bring the chilled refrigerant fluid into thermal communication with the liquid coolant to cool the liquid coolant below ambient temperature. Chiller 600 may then direct the liquid coolant to back to the LED unit 100, via the air cooler unit 200.

Figure 4:
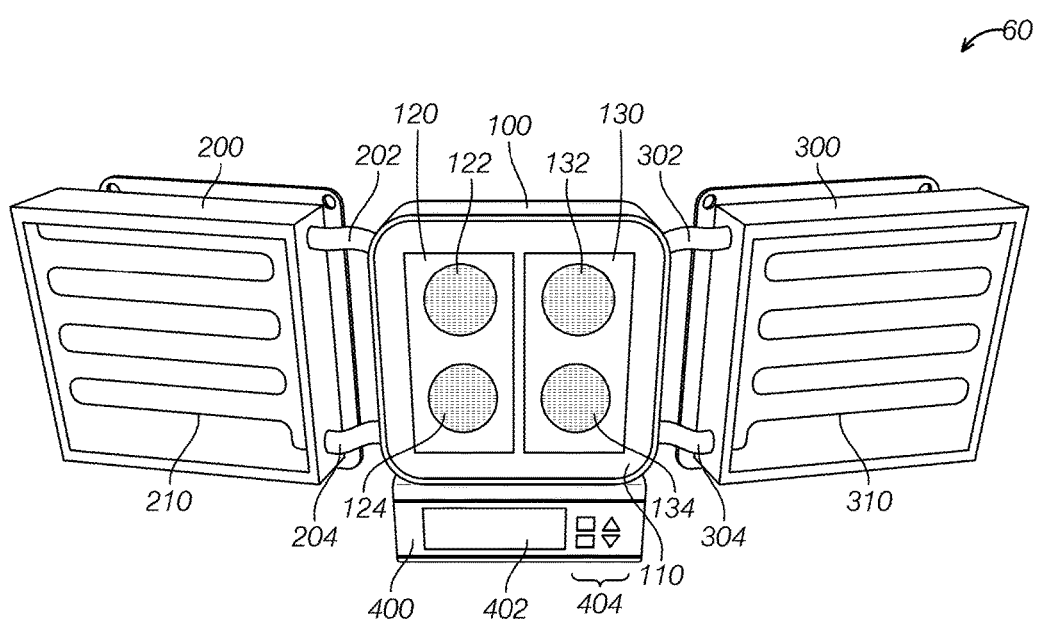
FIG. 4 is a front perspective view of a LED unit, air heater and an air cooler.
Figure 5:
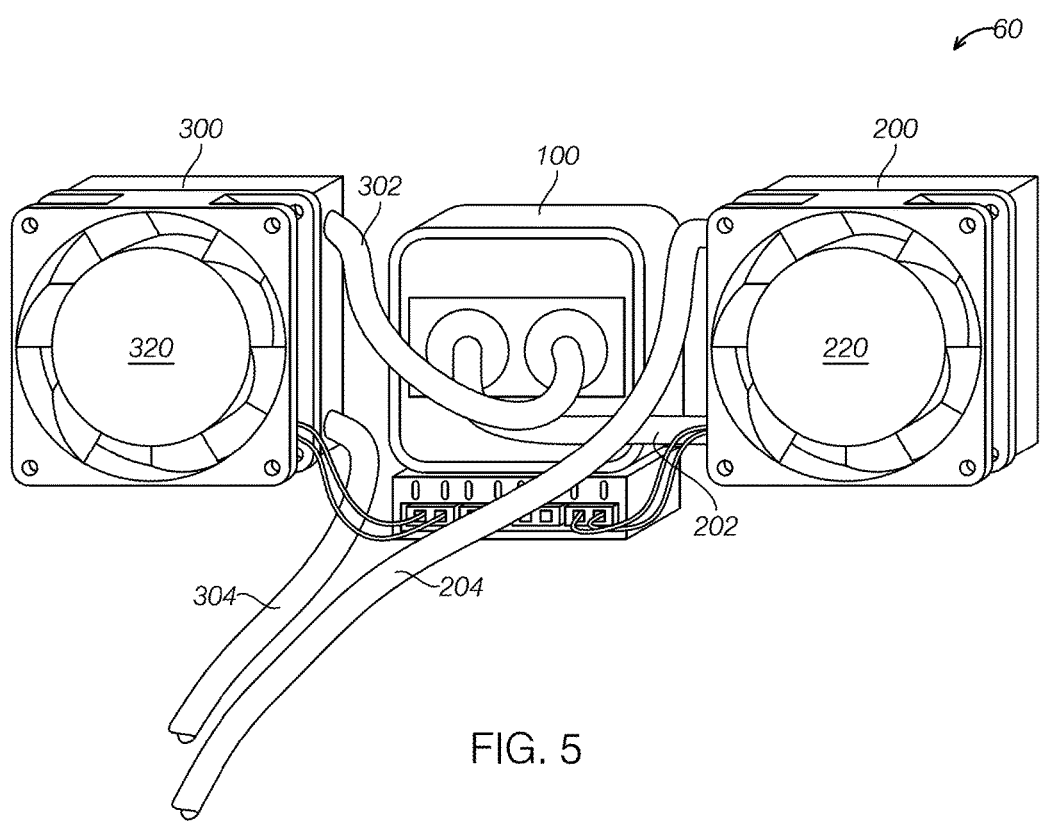
FIG. 5 is a rear perspective view of the LED unit of FIG. 4.

Turning attention now to FIGS. 4-5, LED unit 100, air cooler unit 200 and air heater unit 300 may be mounted as an integral assembly 60 in enclosure 800. Thus, in some embodiments, air cooler unit 200 and the air heater unit 300 may be mounted proximal LED unit 100. Further, in some embodiments, the integral assembly 60 may include controller 400.

In other embodiments, the air cooler unit 200, air heater unit 300 and/or controller 400 may be mounted separately in enclosure 800. Additionally, in still other embodiments, all or a portion of the controller 400 may be mounted outside the enclosure 800 to allow the climate within the enclosure to be controlled from outside the enclosure.

Air cooler unit 200 may be in fluid communication with chiller unit 600 via hose 204. Air cooler unit may be in fluid communication with LED unit 100 via hose 202. Air cooler unit 200 may include heat exchanger 210 and fan 220. Heat exchanger 210 may include a coil to bring air into thermal communication with the chilled liquid coolant from chiller 600. Fan 220 may force air through the heat exchanger 210 in order to lower the air temperature in enclosure 800.

As described above, the liquid coolant may come into thermal communication with LED modules 120, 130 in the housing 110, thereby heating the liquid coolant. The heated liquid coolant may then flow to the air heating unit 300 via hose 302. Air heater unit 300 may include heat exchanger 310 and fan 320. Heat exchanger 310 may include a coil to bring air into thermal communication with the heated liquid coolant from LED unit 100. Fan 320 may force air through the heat exchanger 310 in order to raise the air temperature in enclosure 800.

In the illustrated embodiment, LED module 120 includes LED arrays 122, 124 mounted to the LED submount. Similarly, LED module 130 includes LED arrays 132, 134 mounted to the LED submount. As described above, the respective submounts of LED modules 120, 130 are in thermal communication with the liquid coolant flowing through housing 110. LED arrays 122, 124, 132, 134 may be covered by a transparent cover of housing 110. In one embodiment, a lens attachment (not shown) may be secured to the transparent cover. The lens attachment may be configured to channel or direct light from the LED arrays 122, 124, 132, 134 in a particular direction in enclosure 800.

Controller 400 includes a display 402 and controls 404. Controller 400 may be in electrical communication with temperature probe 670, air cooler unit 100, air heater unit 300, and chiller 600. Controller 400 may be configured to control the temperature within enclosure 800. Controller 400 may be configured by a user via the control 404 and the display 402. For example, a user may input a temperature setpoint via controls 404.

Controller 400 may sense the temperature within the enclosure via temperature probe 670. Thus, by comparing the setpoint to the sensed temperature, Controller 400 may sense high and low temperature excursions. Controller 400 may be configured to respond to temperature excursions of a predetermined magnitude (e.g., 2 degrees F.). For example, controller 400 may control one or more of the air cooler unit 100, air heater unit 300, and chiller 600 in order to respond to the excursion.

In one embodiment, the controller may respond to a low temperature excursion (i.e., the sensed temperature is too low compared to the set point) by first sensing the low temperature excursion via temperature probe 670. Controller 400 may then deactivate chiller 600 such that the chiller stops chilling the liquid coolant. Controller 400 may deactivate the air cooler unit 100. For example, the controller 400 may cut the power to fan 220. Controller 400 may activate the air heater unit 300. For example, the controller 400 may power on fan 320.

In one embodiment, the controller may respond to a high temperature excursion (i.e., the sensed temperature is too high compared to the set point) by first sensing the high temperature excursion via temperature probe 670. Controller 400 may then activate chiller 600. Controller 400 may activate the air cooler unit 100. For example, the controller 400 may power on fan 220. Controller 400 may deactivate the air heater unit 300. For example, the controller 400 may cut power to fan 320.

Figure 6:
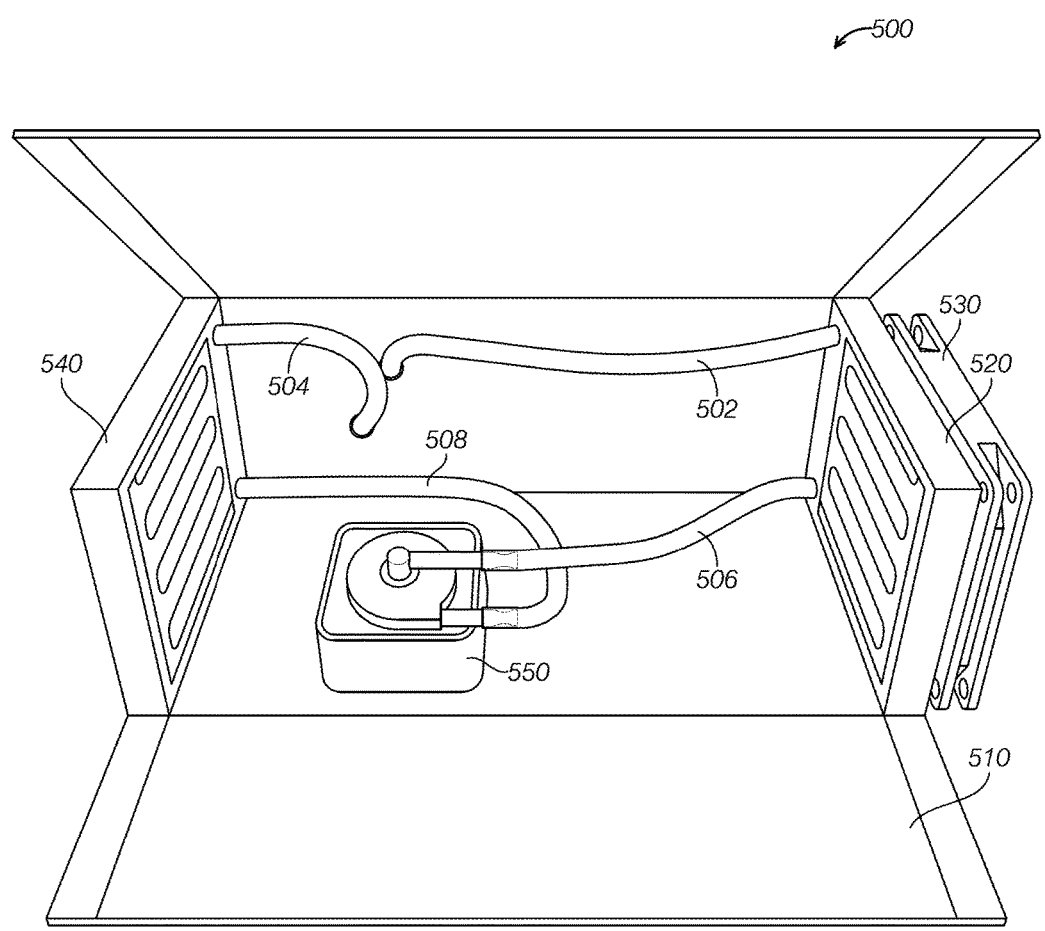
FIG. 6 is a side perspective view of a heat exhaust unit, with the cover pulled back to show the interior components.

Turning now to FIG. 6, one example of a heat exhaust unit, heat exhaust unit 500, is shown. Heat exhaust unit includes recirculation pump 550, a first exhaust heat exchanger 520, a fan 530, and a second exhaust heat exchanger 540. In the illustrated embodiment, heat exhaust unit 500 includes recirculation pump 550 as an integral component mounted within the heat exhaust unit. In other embodiments, recirculation pump 550 may be a separate component disposed either upstream or downstream of the heat exhaust unit.

Heat exhaust unit 500 comprises a tubular structure 510. In some embodiments, the tubular structure 510 may be constructed of sheet metal. In the illustration of FIG. 6, the tubular structure is shown as peeled back to reveal the inner composition of heat exhaust unit 500. In use, however, the tubular structure 510 may be a closed tube so as to direct air through it.

Thus, the tubular structure may have an air inlet and an air outlet. The first exhaust heat exchanger 520 may be located in the air inlet. The first exhaust heat exchanger 520 may be in fluid communication with the housing 110 of LED unit 100, via hose 502 for example. In those embodiments which include an air heater unit, the first exhaust heat exchanger may be in fluid communication with the housing 110 via the air heater unit.

Fan 530 may be configured to force ambient air through tubular structure 510. In some embodiments, fan 530 may be mounted proximal to first exhaust heat exchanger 520 near the inlet of tubular structure 510. In other embodiments, fan 530 may be mounted proximal to second exhaust heat exchanger 540 near the outlet of tubular structure 510. In still other embodiments, tubular structure may include a second fan, one mounted near the inlet and one mounted near the outlet of tubular structure 510.

Second exhaust heat exchanger 540 may be mounted at the air outlet of tubular structure 510. The liquid coolant may flow from the first exhaust heat exchanger 520 to the second exhaust heat exchanger 540 via hoses 506, 508 and recirculation pump 550 for example. Thus, ambient air may flow through the tubular structure 510 and thereby come into thermal communication with the liquid coolant both at the inlet, via first exhaust heat exchanger 520, and again at the outlet via second exhaust heat exchanger 540. In other embodiments, heat exhaust unit may comprise only a single heat exchanger.

Figure 7:
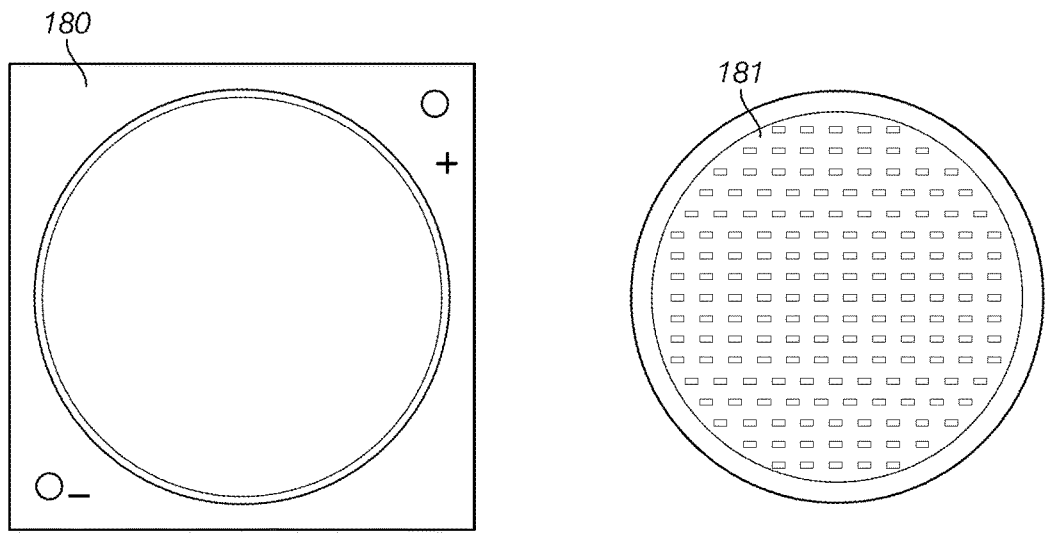
FIG. 7 is top view of the components of a first example of an LED module, including an LED array and a first example of a submount.

Turning now to FIG. 7, the components of a first example of an LED module are shown. As can be seen, the LED module includes a submount 180 and an LED array 181. Submount 180 may be comprised of a light-absorbing material, such as a ceramic material. Submount 180 includes a depression. The depression is configured to receive the LED array 181. As can be appreciated by the reader, submount 180 may absorb some of light reflected in an enclosure having mirror-like surfaces. Thus, in some embodiments, submount 180 may radiate undesirable heat into the enclosure.

Figure 8:
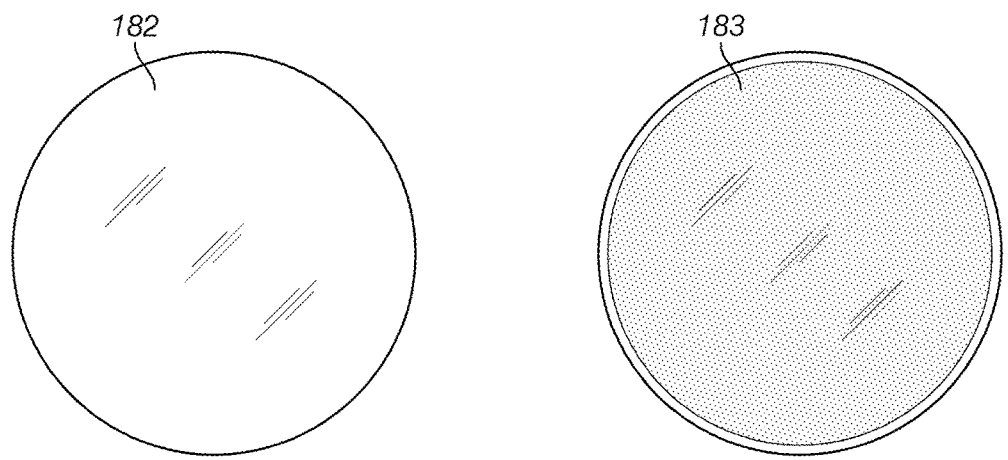
FIG. 8 is top view of a second example of a submount.

Turning now to FIG. 8, an alternative submount is shown. The alternative submount is comprised of a transparent wafer 182 and a mirrored coating 183. Transparent wafer 182 may be comprised of a transparent material, such as sapphire crystal. The underside of wafer 182 may be coated with mirrored coating 183. Mirrored coating 183 may comprise a mirror-like material such as an aluminized layer. An LED array may mounted to the alterative submount. Thus, light emitted toward the submount 180 by the LED array 181 may travel though the transparent wafer 182 and be reflected back away from the submount 180. In this regard, undesirable heating of the alternative submount may be reduced by minimizing the light absorbed by the alternative submount.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A controlled-environment plant growing system comprising:
   a plant growing enclosure having mirror-like inner surfaces;
   a liquid-cooled LED unit mounted to the enclosure and configured to shine light in the enclosure, the LED unit comprising:
   one or more LED modules;
   a transparent, liquid-tight housing, the housing encasing the one or more LED modules, the housing comprising:
   a transparent cover;
   a transparent base in thermal communication with the LED modules;
   an inlet configured to receive a liquid coolant into the housing;
   an outlet configured to expel the liquid coolant from the housing;
   a heat exhaust unit in fluid communication with the housing, wherein the heat exhaust unit is configured to receive the liquid coolant from the housing and transfer heat from the liquid coolant into an ambient atmosphere, wherein the heat exhaust unit comprises:
   a tubular structure having an air inlet and an air outlet;
   a first exhaust heat exchanger located in the air inlet, wherein the first exhaust heat exchanger is in fluid communication with the housing;
   a second exhaust heat exchanger located in the air outlet, wherein the second exhaust heat exchanger is in fluid communication with the first exhaust heat exchanger; and
   a fan a configured to force ambient air through the tubular structure; and
   a recirculation pump configured to return the liquid coolant to the housing.

2. The system of claim 1, wherein the recirculation pump is located within the tubular structure, and wherein the recirculation pump is configured to receive the liquid coolant from the first exhaust heat exchanger and transfer it to the second exhaust heat exchanger.

3. The system of claim 1, comprising a thermostat switch configured to monitor an operating temperature of the one or more LED modules, the system being configured to power off the LED modules if the operating temperature exceeds a threshold value.

4. The system of claim 1, comprising a lens attachment secured to the transparent cover, wherein the lens attachment is configured to direct the light from the one or more LED modules.

5. The system of claim 1, wherein the system is free of a metal heatsink.

6. A controlled-environment plant growing system comprising:
   a plant growing enclosure having mirror-like inner surfaces;
   a liquid-cooled LED unit mounted to the enclosure and configured to shine light in the enclosure, the LED unit comprising:
   one or more LED modules;
   a transparent, liquid-tight housing, the housing encasing the LED modules, the housing comprising:
   a transparent cover;
   a transparent base in thermal communication with the LED modules;
   an inlet configured to receive a liquid coolant into the housing;
   an outlet configured to expel the liquid coolant from the housing, after the liquid coolant has been heated by the LED modules;
   an air cooler unit mounted in the enclosure and in fluid communication with the housing inlet, wherein the air cooler unit is configured to lower the temperature of the air in the enclosure via heat exchange with the liquid coolant;
   an air heater unit mounted in the enclosure and in fluid communication with the housing outlet, wherein the air heater unit is configured to raise the temperature of the air in the enclosure via heat exchange with the heated liquid coolant;
   a heat exhaust unit in fluid communication with the housing, wherein the heat exhaust unit is configured to receive the liquid coolant from the housing and transfer heat from the liquid coolant into an ambient atmosphere; and
   a recirculation pump configured to return the liquid coolant to the housing.

7. The system of claim 6, wherein the heat exhaust unit comprises:
   a tubular structure having an air inlet and an air outlet;
   a first exhaust heat exchanger located in the air inlet, wherein the first exhaust heat exchanger is in fluid communication with the housing;
   a second exhaust heat exchanger located in the air outlet, wherein the second exhaust heat exchanger is in fluid communication with the first exhaust heat exchanger; and
   a fan configured to force ambient air through the tubular structure.

8. The system of claim 7, wherein the recirculation pump is located within the tubular structure, and wherein the recirculation pump is configured to receive the liquid coolant from the first exhaust heat exchanger and transfer it to the second exhaust heat exchanger.

9. The system of claim 6, comprising a thermostat switch configured to monitor an operating temperature of the one or more LED modules, the system being configured to power off the LED modules if the operating temperature exceeds a threshold value.

10. The system of claim 6, comprising a lens attachment secured to the transparent cover, wherein the lens attachment is configured to direct the light from the one or more LEDs.

11. The system of claim 6, wherein the system is free of a metal heatsink.

12. The system of claim 6, comprising:
a temperature probe mounted in the enclosure;
a controller in electronic communication with the temperature probe, the air cooler unit, and the air heater unit, wherein the controller is configured to control the temperature within the enclosure by sensing the temperature within the enclosure via the temperature probe and activating the air cooler unit or the air heater unit as necessary.

13. The system of claim 6, wherein the air heater comprises:
a warming heat exchanger in fluid communication with the housing outlet, the warming heat exchanger being configured to raise the temperature of the air in the enclosure via heat exchange with the heated liquid coolant; and
a fan proximal the warming heat exchanger configured to force air across the warming heat exchanger.

14. The system of claim 6, wherein the air cooler comprises:
a cooling heat exchanger in fluid communication with the housing inlet, the cooling heat exchanger being configured to lower the temperature of the air in the enclosure via heat exchange with the liquid coolant; and
a fan proximal the cooling heat exchanger configured to force air across the cooling heat exchanger.

15. The system of claim 6, comprising a chiller in liquid communication with the heat exhaust unit and the LED unit; wherein the chiller is configured to:
receive liquid coolant from the heat exhaust unit;
cool the liquid coolant below ambient atmosphere temperature via a refrigeration cycle; and
direct the liquid coolant to the LED unit.

16. A controlled-environment plant growing system comprising:
a plant growing enclosure having mirror-like inner surfaces;
a liquid-cooled LED unit mounted to the enclosure and configured to shine light in the enclosure, the LED unit comprising:
one or more LED modules;
a transparent liquid-tight housing, the housing encasing the one or more LED modules, the housing comprising:
a transparent cover;
a transparent base in thermal communication with the LED modules;
an inlet configured to receive a liquid coolant into the housing;
an outlet configured to expel the liquid coolant from the housing, after the liquid coolant has been heated by the LED modules;
an air cooler unit mounted in the enclosure and in fluid communication with the housing inlet, wherein the air cooler unit is configured to lower the temperature of the air in the enclosure via heat exchange with the liquid coolant;
an air heater unit mounted proximal to the housing outlet and in fluid communication therewith, wherein the air heater unit is configured to raise the temperature of the air in the enclosure via heat exchange with the heated liquid coolant;
a heat exhaust unit in fluid communication with the housing, wherein the heat exhaust unit is configured to receive the liquid coolant from the housing and transfer heat from the liquid coolant into an ambient atmosphere;
a recirculation pump configured to return the liquid coolant to the housing;
a chiller in liquid communication with the heat exhaust unit and the LED unit, wherein the chiller is configured to:
receive liquid coolant from the heat exhaust unit;
cool the liquid coolant below ambient atmosphere temperature via a refrigeration cycle; and
direct the liquid coolant to the LED unit;
a temperature probe mounted in the enclosure; and
a controller in electronic communication with the temperature probe, the air cooler unit, the air heater unit, and the chiller, wherein the controller is configured to control the temperature within the enclosure.

17. The system of claim 16, wherein the controller is configured to respond to a low temperature excursion in the enclosure by:
sensing the low temperature excursion within the enclosure via the temperature probe;
deactivating the chiller;
deactivating the air cooler unit; and
activating the air heater unit.

18. The system of claim 16, wherein the controller is configured to respond to a high temperature excursion in the enclosure by:
sensing the high temperature excursion within the enclosure via the temperature probe;
activating the chiller;
activating the air cooler unit; and
deactivating the air heater unit.

19. The system of claim 16, wherein the system is free of a metal heatsink.

* * * * *